Patented Dec. 11, 1951

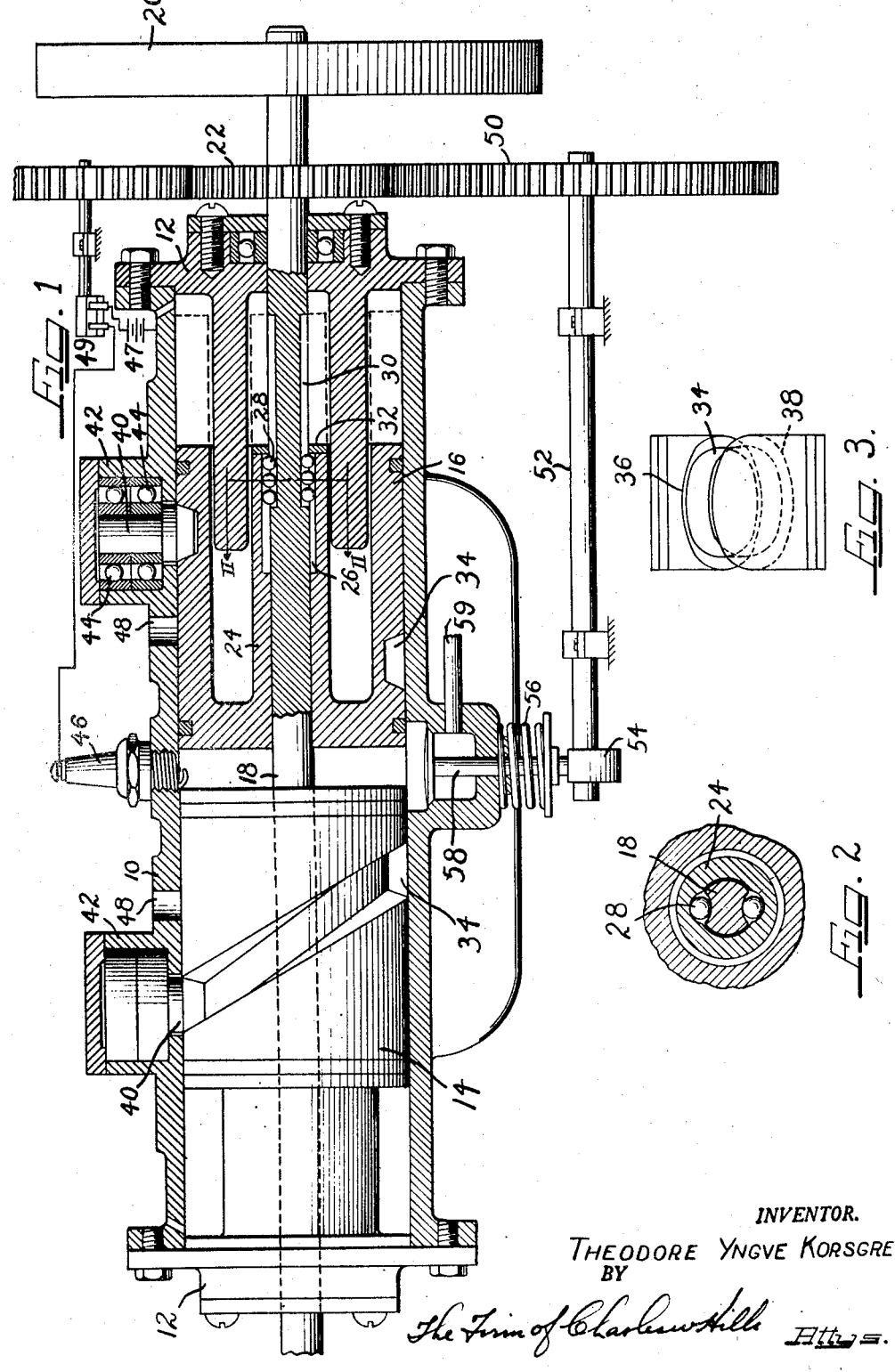

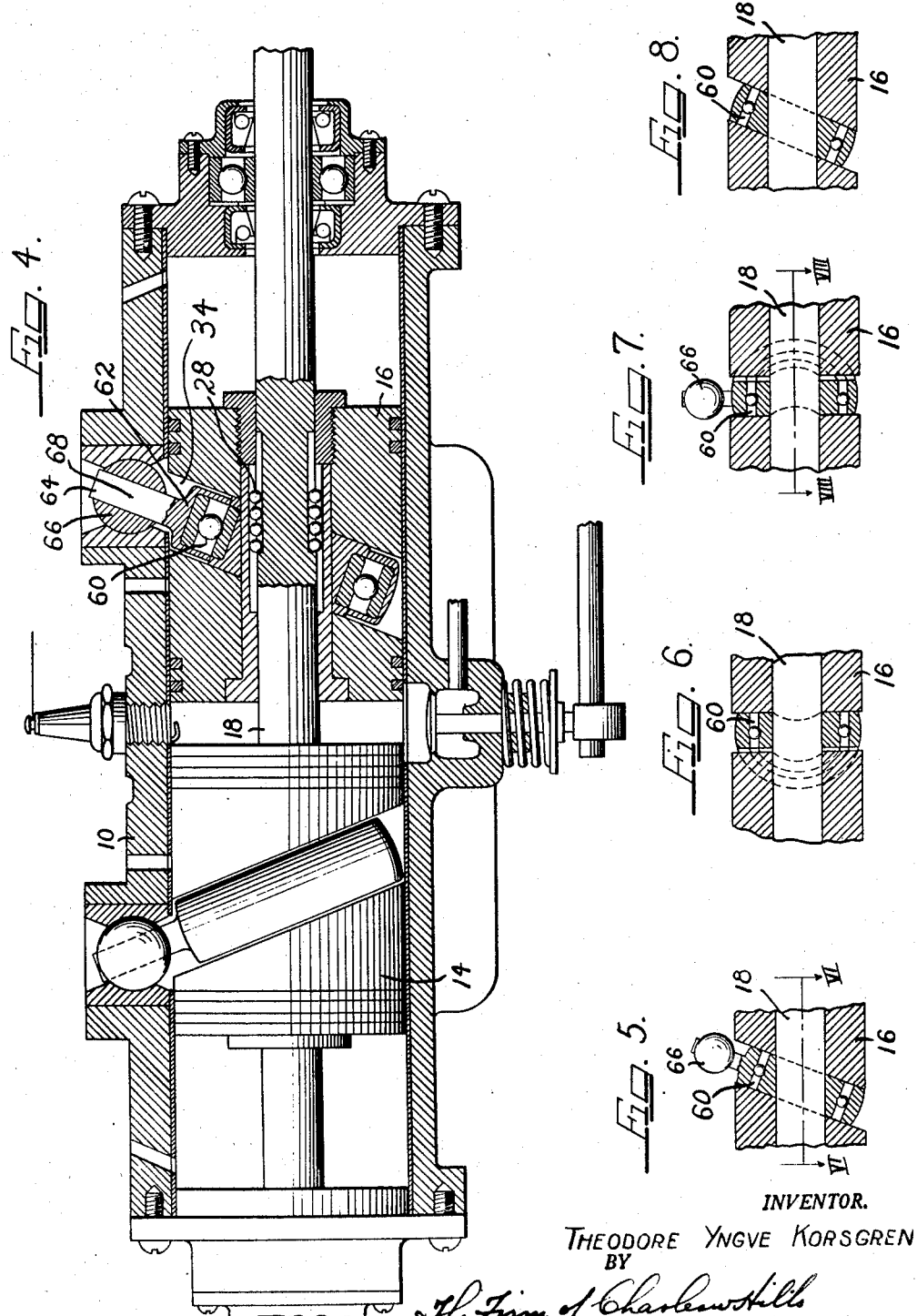

2,578,559

UNITED STATES PATENT OFFICE 2,578,559

MOTION CONVERTING MECHANISM

Theodore Yngve Korsgren, Winnetka, Ill.

Application December 6, 1946, Serial No. 714,457

10 Claims. (Cl. 74—60)

My invention relates to reciprocating engines such as internal combustion engines, compressors, pumps, and the like.

It is an object of my invention to provide a reciprocating engine which does not require a crankshaft assembly and thus eliminates the space and weight requirements associated therewith.

A further object of my invention is to provide an improved reciprocating engine having features of construction, combination, and arrangement, whereby a high degree of simplicity of construction and reliability of operation is achieved.

Further it is an object of my invention to provide an improved reciprocating engine having inherently balanced rotating parts to the end that the mass of these parts shall not tend to cause vibratory forces and torsional vibration.

Yet another object of my invention is to provide a reciprocating engine wherein the reciprocating parts are inherently balanced so that minimum vibrational forces are imparted to the engine frame and the mounting upon which it is located.

Yet another object of my invention is to provide an improved reciprocating engine wherein the crankshaft normally required by such engine is avoided and in which friction loss is minimized to the end that maximum efficiency of operation shall be attained.

Another object of my invention is to provide a reciprocating engine construction particularly suitable for small engines having only a single cylinder.

Still another object of my invention is to provide an improved mechanical movement for the conversion of reciprocating motion to rotary motion or vice versa.

The novel features which I believe to be characteristic of my invention are set forth with particularity in the appended claims. My invention, however, both as to its organization and method of operation, together with further objects and advantages thereof, may best be understood by reference to the following description taken in connection with the accompanying drawings.

On the drawings:

Figure 1 is a partial cross-section view of an internal combustion engine embodying the features of my invention;

Figure 2 is a cross-section view taken through the axis II—II, Figure 1;

Figure 3 is a somewhat diagrammatic view showing the construction of the pistons used in the engine of Figure 1;

Figure 4 is a view of a modification of the engine of Figure 1 wherein efficiency is improved by use of ball bearings; and Figures 5, 6, 7, and 8 are somewhat diagrammatic illustrative views indicating the position of the component parts of the engine of Figure 4 under various conditions of operation.

As shown on the drawings:

A two cycle, single valve, internal combustion engine incorporating features of my invention is shown in Figure 1. In this figure, 10 designates the cylinder structure, this unit comprising a member having a cylindrical bore closed at opposite ends by members 12. Pistons 14 and 16 are mounted within cylinder 10 in opposed relation so that their active surfaces face each other. A shaft 18 passes through pistons 14 and 16 and projects from the closure 12 to provide a shaft from which useful work may be taken. This shaft may, for example, have mounted upon it a flywheel 20 to maintain nearly constant rotational velocity despite the periodic application of torque incident to operation of the engine and timing gear 22 to cause injection and ignition of fuel at the proper moments. As will be described in further detail hereafter, the pistons 14 and 16 are connected to the wall of cylinder 10 so that the reciprocatory motion thereof due to successive ignitions of fuel within the cylinder is converted to rotating motion which is communicated to shaft 18.

The method of connecting shaft 18 and pistons 14 and 16 will be evident from examination of Figure 2 which is a cross-section view through section II—II, Figure 1. As shown in this figure, the inner portion 24 of piston 16 encircles shaft 18, so as to provide a seal and prevent escape of gas between these elements. In the portion 26, Figure 1, the inner portion 24 of piston 16 has increased diameter and clears the surface of shaft 18. Furthermore, along this portion a pair of recesses are provided in portion 24 of piston 16 to accommodate ball bearings 28. A correspondingly recessed region 30 is provided in shaft 18. As will be evident from examination of Figure 1, this structure permits piston 16 to slide relative to shaft 18 as indicated by the dotted lines of that figure. It will further be evident, that the bearings are prevented from rolling free of the recesses provided to contain them by retainer 32 which is attached to piston 16. As will be evident from Figure 2, the balls 28, while permitting relative translational movement between piston 16 and shaft 18, prevent relative rotation of these elements. A similar structure is provided to prevent relative rotation between piston 14 and shaft 18, thus causing pistons 14 and 16, together with shaft 18, to execute common rotatory movement without being limited as to the relative reciprocatory movement.

Figure 3 shows in somewhat diagrammatic form the structure of pistons 14 and 16. As will be evident from this figure, these pistons are provided with a closed groove 34 completely circling the outer surface thereof. This groove passes from a point 36 having minimum distance from the active piston face to the diametrically opposite point 38 of maximum distance from the active face. As will be further evident from Figure 3, this groove is shaped relative to its distance in the direction of the axis of the piston so as to provide a smooth change in distance from the piston face as the piston is traversed in the circumferential direction.

As shown in Figure 1, pin 40 rides in the groove 34 of piston 16. This pin is mounted within housing 42 which is rigidly attached to the cylinder 10 so that no motion thereof relative to the cylinder can take place. Thus, as piston 16 moves along the axis of the cylinder 10 the pin 40 remains at a constant position, thus causing the piston to turn or rotate until the point on the groove 34 in contact with pin 40 has distance from the piston face corresponding to the position of the piston. Thus, in the position shown in Figure 1, the piston is rotated so that the pin 40 rides on the point 38, Figure 3, where the groove 34 has maximum distance from the active piston face. However, when piston 16 assumes the position shown in the dotted lines of Figure 1, the pin 40 must ride in groove 34 at the point 36, Figure 3, having minimum distance from the active piston face. From Figure 3, it will be evident that to pass from point 38 to point 36 without rotation of the pin 40 about the shaft 18, it is necessary for the piston to rotate through an angle of 180 degrees.

Alternatively, if shaft 18 is rotated, the pin 40 rides over various portions of the groove 34 passing in succession from point 36, Figure 3, where the piston has a position shown in the dotted lines of Figure 1 to point 38, Figure 3, where it has the position shown in the solid lines of Figure 1. Thus, as the shaft 18 is rotated, the piston is forced to execute reciprocatory motion by reason of the restraining action of pin 40 acting in groove 34.

Piston 14 is likewise connected to shaft 18 by ball bearings 28 and has a point in its groove 34 restrained in position from cylinder 10 by a pin 40. Consequently this piston rotates in the same manner as above described with reference to piston 16.

The friction losses incident to the engagement of pins 40 with grooves 34 in pistons 14 and 16 are minimized by rotatably mounting these pins relative to housing 42 by ball bearings 44, thus permitting rolling contact between pins 40 and the groove 34 rather than sliding contact.

Having described how the structure of Figure 1 causes shaft 18 to rotate in accord with the position of pistons 14 and 16 relative to the axis of the cylinder 10, the operation of the mechanism of Figure 1 as an internal combustion engine will be readily understood. As shown in the figure, a spark plug 46 is provided to initiate ignition at the instant pistons 14 and 16 are closest to each other. This ignition is accomplished by the connection of spark plug 46 to source of electromotive force 47 by commutator 49 which rotates with shaft 18 by means of connection with gear 22. At this time, gas pressure is produced in the cylinder and pistons are forced outwardly relative to each other, thereby rotating shaft 18, gear 22, and flywheel 20. As the pistons approach the positions shown in the dotted lines of Figure 1, the active piston surfaces slide free of openings 48, thereby permitting exhaust of the spent gases to the atmosphere. Simultaneously, rotation of gear 22 causes corresponding rotation of gear 50, shaft 52 and cam 54. Cam 54 is proportioned so that when cylinder 16 is in the position of the dotted lines of Figure 1, it overcomes the force of spring 56 and opens valve 58 to admit fuel from pipe 59 to the cylinder. As the rotation of shaft 18 continues by reason of its own inertia, together with the inertia of the flywheel 20 and the other rotating parts, the pistons are forced inwardly relative to each other and the openings 48 closed. At this time valve 58 is likewise closed and the gas within the cylinder compressed. When the pistons reach the positions shown in the solid lines of Figure 1, the mixture is ignited by spark plug 46 and the cycle repeated.

It will be apparent to those skilled in the art that the engine of Figure 1 avoids the need for a crankshaft in as much as the groove 34 and the pin 40 causes the pistons to rotate in accordance with their reciprocatory motion. Thus, it is merely necessary to connect the piston to shaft 18 to procure rotating motion from which mechanical work may be taken. The resultant engine is accordingly of smaller size and reduced weight as compared to an equivalent engine with a crankshaft. Furthermore, mechanical problems, such as torsional vibrations and the like, associated with the use of a crankshaft are avoided, thereby enabling use of greater rotational velocities and achieving correspondingly greater power outputs. It will be further evident to those skilled in the art that the opposed piston arrangement of Figure 1 provides a self-balancing action which eliminates any tendency on the part of the engine to produce vibrational forces on the engine mounting as a result of the varying cylinder pressures. This reduces the noise and vibration incident to the operation of the engine and also permits the use of a lighter engine and less expensive mounting.

Figure 4 shows a modification of the engine of Figure 1 wherein the mechanical efficiency is improved by providing a more efficient method of converting the reciprocatory motion of the pistons to corresponding rotation of the shaft 18. As shown in this figure, the pistons 14 and 16 are mounted in cylinder 10 in a manner similar to that shown in Figure 1, each piston being restrained from relative rotation with respect to shaft 18 by balls 28 in facing registering slots on keyways in said shaft and piston. However, instead of the pins 40 riding on the grooves 34 of the pistons, ball bearings 60 are located therein. The axis of these bearings has a substantial angle relative to the axis of shaft 18 by reason of the curvature groove 34. This will be evident from the view of Figure 3. The outer member or bearing retainer ring 62 is provided with extended portions 64 which has a portion on each side of ball 66 and adapted to receive that ball, thereby limiting motion of outer race 62 to rotation about the center of ball 66. Thus, as the pistons 14 and 16 execute reciprocatory motion relative to each other, they are forced to rotate by the ball bearing 60.

The operation of the ball bearing 60 in converting the reciprocatory motion of the piston to rotational motion of shaft 18 may best be understood by reference to Figures 5, 6, 7, and 8 which show somewhat diagrammatic sketches illustrating the position of the bearing under various conditions of operation. Figure 5 is a cross-section view corresponding to the cross-section shown in Figure 4. In this view it is evident that the bearing 60 is at an angle relative to the shaft 18 and the axis of the piston 16 but is in a plane perpendicular to the plane of cross-section. Figure 6 shows a cross-section view taken along section VI—VI, Figure 5. In this view, the cross-section of the bearing appears as perpendicular to the axis of the piston 16. However, the angle of the bearing relative to the piston is indicated by the dotted lines which show the opposite side of the bearing as viewed from this cross-section.

In Figure 7, the position of the bearing is shown for the case wherein the piston has executed half of its motion from the forward position of Figure 4 to the position of maximum displacement. In this condition, the ball 66 is directly above the cross-section of the bearing as seen in the view of Figure 7 which corresponds to that of Figure 5. However, the bearing is twisted relative to the axis of piston 16 by reason of the relative rotation of piston 16 required for the piston to move to the halfway position while still causing the plane through the centers of bearings 60 to pass through the center of bearing 66. Thus, when viewed through section VIII—VIII, Figure 7, the bearing appears as shown in Figure 8 and appears at an angle to shaft 18.

From the above description it will be evident that the bearing 60 executes two types of motion as the piston reciprocates. One of these motions is the swinging motion about the center of ball 66 and is the plane of the cross-section of Figure 4. The other motion is a twisting motion about a line drawn through the center of bearing 66 and the center of the circles formed by the bearing races. These two motions combine to cause the bearing to force the piston to rotate in accordance with its reciprocatory motion.

It will be apparent to those skilled in the art that the structure of my invention shown in Figure 4 is characterized by a high degree of mechanical efficiency and small frictional losses by reason of the small friction incident to the operation of bearing 60.

It can be shown that the translational motion of pistons 14 and 16, Figure 4, associated with uniform angular velocity of shaft 18 is simple harmonic motion, one cycle of rotation of shaft 18 corresponding to one cycle of motion of the pistons. That is, the connection between shaft 18 and piston 16, for example, due to bearing 60, is such that the variations in position of piston 16 along cylinder 10 for equal angular increments of shaft 18 is sinusoidal. Inasmuch as the acceleration of pistons 14 and 16 associated with this simple harmonic motion is of like frequency with the motion itself, the frequency of any possible vibration imparted to the cylinder 10 is that corresponding to the rotation of shaft 18. While even this vibration is theoretically impossible, it can occur by reason of unbalances between the pistons or similar causes and the fact it has the frequency of rotation of shaft 18 substantially reduces its significance.

It will, of course, be apparent to those skilled in the art that while I have described my invention with respect to a reciprocating engine of the internal combustion type using gasoline, the principles thereof may be applied to compression-ignition engines such as diesel engines, as well as to pump and compressors, the purpose of the unit in the latter applications being to convert rotary motion of a shaft to reciprocating motion of a pair of pistons. It will further be observed that, if desired, a single piston may be used in the engine, thereby avoiding the need for the second piston although introducing the possibility of excessive vibrational forces due to the unbalanced piston operation.

Further engines incorporating the features of this invention are described and claimed in my copending application Serial No. 714,458, filed December 6, 1946, and entitled, "Multiple Piston Engines," now Patent No. 2,532,106.

While I have shown and described a particular embodiment of my invention, it will of course be understood that I do not wish to be limited thereto since many modifications both in the elements disclosed and their cooperative arrangement may be made without departing from the spirit and scope thereof. I, of course, contemplate by the appended claims to cover any such modification as fall within the true spirit and scope of my invention.

I claim as my invention:

1. In combination, a cylinder, a pair of opposed pistons in said cylinder, a pair of bearings mounted on said pistons, each of said bearings having a first race and a second race, said first races being positioned on said pistons at an angle relative to the direction of movement thereof and said second races being anchored to limit movement thereof to bodily movement about points spaced laterally from said pistons, and a shaft connected to rotate with said pistons so that as said pistons execute reciprocatory motion said shaft rotates.

2. In combination, a cylinder, a piston in said cylinder, a bearing mounted on said piston, said bearing having a first race and a second race, said first race being positioned on said piston at an angle relative to the direction of movement thereof and said second race being anchored to limit movement thereof to bodily movement about a point spaced laterally from said piston, and a shaft connected to rotate with said piston so that as said piston executes reciprocatory motion said shaft rotates.

3. In combination, a cylinder, a piston in said cylinder, a ball bearing having an outer race mounted about said piston and having its axis at a substantial angle relative to the axis of said piston, said bearing being contained in a groove provided for the purpose in the surface of said piston, said bearing having an arm extending from said outer race, means restraining said arm so that motion of said outer race is limited to bodily movement about a point intersecting said arm, and a shaft connected to rotate with said piston so that as said shaft is turned said piston reciprocates.

4. A mechanical movement including a reciprocating member, a bearing mounted on said member, said bearing having a first race and a second race, said first race being mounted on said member at an angle relative to the direction of motion thereof and said second race being anchored to limit movement thereof to bodily movement about a predetermined point, whereby reciprocation of said member causes rotation thereof.

5. A mechanical movement including a reciprocating member, a ball bearing having its inner race attached to said member along an axis having a substantial angle to the axis of said reciprocating member, and means restraining the outer race of said bearing to bodily movement about a predetermined point, thus causing rotation of said member in accord with the reciprocating movements thereof.

6. A mechanical movement including a reciprocating member, a bearing having its inner race attached to said member along an axis at a substantial angle to the axis of said member, an auxiliary bearing, the outer race of said first bearing having an extension pivotally engaged with said auxiliary bearing so that the outer race of said first bearing is limited to rotation about said auxiliary bearing, thus causing rotation of said reciprocating member in accord with the reciprocating movements thereof.

7. A mechanical movement including a rotatable reciprocating member, means guiding said reciprocating member for rotational movement and for translational movement in a fixed rectilinear path, and motion converting means converting the translational motion of said member to rotational movement including a motion converting member having said reciprocating member mounted thereon for free rotational movement with respect thereto and extending at an acute angle to the axis of rotation thereof, and means restraining said motion converting member for pivotal movement about an axis extending transversely of the axis of rotation of said reciprocating member and spaced laterally therefrom.

8. A mechanical movement including a rotatable reciprocating member, means guiding said reciprocating member for rotational movement and for translational movement in a rectilinear path, and motion converting means converting the rectilinear movement of said member to rotational movement including a motion converting member recessed within said reciprocating member, said reciprocating member being journalled on said motion converting member for rotational movement with respect thereto about a longitudinal axis and said motion converting member being inclined with respect to the axis of rotation of said reciprocating member at an angle of less than 90°, said motion converting member having an arm extending therefrom beyond the limits of said reciprocating member, and bearing means journalling said arm for pivotal movement about an axis spaced laterally from and extending transversely of the axis of rotation of said reciprocating member.

9. A mechanical movement including a rotatable reciprocating member, a shaft guiding said reciprocating member for rotational and rectilinear movement, and motion converting means converting the rectilinear motion of said member to rotational movement including a motion converting member recessed within said reciprocating member and journalled therein for rotational movement with respect thereto about an axis extending at an acute angle to the axis of rotation of said shaft and having an arm extending therefrom beyond the limits of said reciprocating member, a reaction member on said arm having a substantially spherical reaction surface, and fixed bearing means having bearing engagement with said spherical surface and journalling said arm for movement about an axis spaced laterally from and extending transversely of the axis of rotation of said reciprocating member.

10. A mechanical movement including a rotatable reciprocating member, a shaft journalled for rotational movement and held from rectilinear movement and having said rotatable reciprocating member mounted thereon, a plurality of balls having interengaging connection between said shaft and rotatable reciprocating member and rotating said shaft upon rotational movement of said rotatable reciprocating member, motion converting means converting the rectilinear motion of said reciprocating member to rotational movement including a motion converting member journalled on said reciprocating member for rotational movement with respect thereto about an axis inclined with respect to the axis of said shaft of less than 90°, an arm extending from said motion converting member, and bearing means journalling said arm for pivotal movement about an axis spaced laterally from said motion converting member and extending transversely of the axis of rotation of said shaft.

THEODORE Y. KORSGREN.

REFERENCES CITED

The following references are of record in the file of this patent:

UNITED STATES PATENTS

| Number | Name | Date |
|---|---|---|
| 855,256 | Morey | May 28, 1907 |
| 1,011,126 | Jones | Dec. 5, 1911 |
| 1,613,136 | Schieffelin | Jan. 24, 1927 |
| 1,629,686 | Dreisbach | May 24, 1927 |
| 1,736,822 | Dreisbach | Nov. 26, 1929 |
| 1,951,428 | MacKirdy | Mar. 20, 1934 |
| 2,477,542 | Lane | July 26, 1949 |